United States Patent Office 3,494,967
Patented Feb. 10, 1970

3,494,967
STABILIZATION OF CHLOROPRENE MONOMERS
Hubert Charles Bailey, London, England, assignor to BP Chemicals (U.K.) Limited, London, England, a British company
No Drawing. Filed Apr. 19, 1967, Ser. No. 631,876
Claims priority, application Great Britain, Apr. 26, 1966, 18,145/66
Int. Cl. C07c 17/40
U.S. Cl. 260—652.5     11 Claims

ABSTRACT OF THE DISCLOSURE

A process for stabilizing chloroprene monomer by the addition of a nitroxide having the essential skeletal structure:

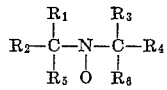

where $R_1$ to $R_4$ are alkyl groups and no hydrogen is bound to the remaining valencies of the carbon bonded to nitrogen.

---

The present invention relates to the stabilisation of chloroprene.

Chloroprene can be polymerised under controlled conditions to give useful rubbery polymers, but the monomer also has a strong tendency to polymerise during preparation, recovery, and storage. Various methods have been proposed for the stabilisation of polymerisable monomers e.g. the addition of p-benzo-quinone, hydroquinone, nitric oxide.

We have now found it possible to obtain compositions containing chloroprene monomer which are stabilised against polymerisation much more effectively than is possible by the methods for the inhibition of the polymerisation of chloroprene monomer mentioned above. In particular the stabilised compositions of the present invention show less tendency to form coloured products than do those stabilised by nitric oxide, a commonly used inhibitor.

Accordingly the present invention is a process for stabilising chloroprene monomer against polymerisation which comprises the addition of a nitroxide having the essential skeletal structure:

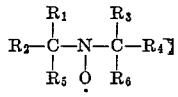

wherein $R_1$, $R_2$, $R_3$ and $R_4$ are alkyl groups and no hydrogen is bound to the remaining valencies.

The present invention is also a composition comprising chloroprene monomer stabilised by a nitroxide having the essential structure (1).

The process of the present invention is particularly advantageous because it is much less affected by the presence of molecular oxygen than processes using nitric oxide. The presence of even very small quantities of oxygen in chloroprene stabilised by nitric oxide catalyses the formation of undesirable adducts of chloroprene with nitric oxide and nitrogen dioxide, which are often coloured. Nitroxides having the structure (1) are able to tolerate very much higher concentrations of oxygen than nitric oxide without formation of undesirable products and destruction of the ability to stabilize the monomer against polymerisation. The process of the present invention offers the very great advantage that the effect of small leaks of oxygen, e.g. as air, into vessels containing chloroprene which are difficult to prevent in practice, is not so disastrous as it would be if the stabilizer were nitric oxide. It is possible using the process of the present invention to dispense with the procedures for removing oxygen from chloroprene and vessels containing it which are necessary when using nitric oxide. These procedures include for example flushing the chloroprene with inert gas e.g. nitrogen to remove dissolved oxygen and are an additional complication when using nitric oxide. While rigorous removal and exclusion of oxygen may be desirable for the very best results when using nitroxides of structure (1), as the presence of oxygen will lead to some deterioration of the ability of the nitroxides to stabilize chloroprene, the ability to dispense with it is an important advantage of the process of the present invention. The molar concentration of oxygen which may be tolerated may be equal to the molar concentration of the nitroxide.

Another advantage of the process of the present invention is that it makes possible particularly effective suppression of the formation of pop-corn polymer. "Pop-Corn" polymer is a very high molecular weight polymer insoluble in most solvents. Its presence is most undesirable as it tends to block reactors and distillation apparatus and it is exceedingly difficult to remove from any vessel in which it forms.

In the essential skeletal structure (1) the alkyl groups $R_1$ to $R_4$ may be the same or different, and preferably contain 1 to 15 carbon atoms. It is particularly preferred to use nitroxides having the essential skeletal structure (1) in which $R_1$ to $R_4$ are methyl, ethyl or propyl groups.

The remaining valencies of the carbon atoms in the essential skeletal structure which are not satisfied by $R_1$ to $R_4$ or nitrogen may be satisfied by any atom or group except hydrogen which can bond covalently to carbon although the use of groups which may adversely affect the stabilizing power of the nitroxide structure (1) are undesirable. Examples of suitable atoms or groups are halogen, cyanide,

—SPh, alkenyl in which the double bond is not in conjugation with the group

and alkyl. The two remaining valencies may also form part of a ring. Examples of suitable compounds having the essential skeletal structure (1) and in which the remaining valencies of (1) form part of the ring are pyrrolidine-1-oxyls and piperidine-1-oxyls. Particular examples of a suitable compounds in which the remaining valencies of the essential skeletal structure (1) form part of a ring are the 2,2,6,6 tetramethyl piperidine-1-oxyls e.g. 2,2,6,6,-tetramethylpiperidine-1-oxyl and 2,2,6,6-tetramethyl-4-hydroxy-piperidine-1-oxyl.

Where the remaining valencies of (1) are satisfied by alkyl groups $R_5$, $R_6$ to give a compound of formula:

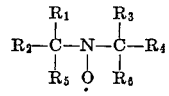

the groups $R_5$ to $R_6$ preferably contain 1 to 15 carbon atoms. Examples of suitable groups $R_5$ and $R_6$ are methyl, ethyl and propyl groups. A specific example of a suitable compound having the essential structure (1) is di-tert-butyl nitroxide.

It is preferred to use nitroxides of structure (1) which contain 8 or 9 carbon atoms in the molecule as these are most effective in suppressing the formation of the undesirable "pop-corn" polymer.

It is found that with the compositions of the present invention there is a measurable increase in the time for which the monomer can be heated before polymerisation starts.

The quantity of nitroxide necessary to give a satisfactory increase in stability is suitably between 10 and 1000 p.p.m., for example 10–100 p.p.m. but concentrations outside these limits can also be used.

The invention will now be illustrated by reference to the following examples.

Example 1

A chloroprene solution was prepared containing $1.2 \times 10^{-2}$ mole/litre of the initiator azo-bis (isobutronitrile) and $1.2 \times 10^{-3}$ mole/litre of di-tert butylnitroxide.

The solution was sealed under vacuum in a dilatometer and the reduction in volume that occurred on heating at 50° C. was measured.

Example 2

In a comparative example not according to the invention a chloroprene solution was prepared and heated under the same conditions as were used in Example 1 except that instead of the nitroxide, $1.2 \times 10^{-3}$ mole/litre of $\alpha,\alpha'$-diphenyl-$\beta$-picryl hydrazil, a well-known free radical scavenger was present.

In both examples there was an induction period, during which the slow formation of dimers of chloroprene occurred, followed by the polymerisation of the monomer at a rate of $7 \times 10^{-2}$ mole/litre/sec. The length of the induction period obtained with di-tert. butylnitroxide was 260 min., that obtained with DPPH was only 140 min.

Example 3

A chloroprene solution was prepared containing $1.2 \times 10^{-2}$ mole/litre of the initiator azo-bis (isobutyronitrile) and $4.7 \times 10^{-4}$ mole/litre of di-tert butylnitroxide. The solution was sealed in dilatometer in vacuo and heated at 50° C.

Example 4

A chloroprene solution was prepared and heated under the same conditions as were used in Example 3 but using $4.7 \times 10^{-4}$ mole/litre of the well-known monomer stabilizer p-benzoquinone instead of the nitroxide.

Benzoquinone gave an induction period of less than 5 min., di-tert butylnitroxide gave an induction period of 100 min. The rate of conversion of monomer to polymer after the induction period was in each case $7 \times 10^{-2}$ mole/litre/sec., which was the same rate as that observed in the absence of any added inhibitor.

Example 5

In each of four test tubes a small seed of chloroprene popcorn polymer was placed on a plug of glass wool situated near the top of the tube. Chloroprene monomers were distilled in vacuo into each tube and condensed at the bottom of the tube, below the level of the popcorn seed. The tubes were then filled with nitrogen at atmospheric pressure, stoppered and stored in the dark at room temperature. In addition to the chloroprene three of the tubes contained a stabiliser:

Tube A contained phenothiazine at a concentration of 0.1% by weight on monomer,

Tube B contained 2,2,6,6-tetramethyl-4-hydroxy-piperidine-1-oxyl at a concentration of 0.1% by weight on monomer, Tube C contained di-tert. butyl nitroxide at a concentration of 0.1% by weight on monomer, Tube D contained no additive i.e. it was a blank.

After six days the contents of the tubes were observed to be as follows:

Tube A contained a very small amount of mobile liquid, the remaining monomer having been converted to popcorn polymer at the top of the tube, Tube B contained one third of the original monomer as a mobile liquid, the remainder was present as popcorn polymer, Tube C contained all the original monomer as a mobile liquid; the popcorn seed had not grown at all, Tube D contained half the original monomer at the bottom in the form of a transparent rubber, the remainder was present at the top of the tube as popcorn polymer.

Tube C was further inspected after 205 days. Hardly any growth of the popcorn seed was apparent and the lower part of the tube contained the original volume of a mobile liquid, which was a mixture of monomer and dimers.

This example demonstrates the superior stabilising action of the nitroxides of the invention as compared with phenothiazine. It should be noted that the pop-corn polymerization takes place in the vapour space above the liquid chloroprene monomer and not in the liquid itself, and that inhibition such as phenothiazine which can stabilize the liquid monomer, at least to some extent, may be quite ineffective in preventing pop-corn polymerization.

Example 6

In each of two tubes a small seed of chloroprene popcorn polymer was placed on a plug of glass wool situated near the top of the tube. Chloroprene monomer was distilled in vacuo into each tube and condensed at the bottom of the tube, below the level of the popcorn seed. The tubes were sealed under vacuum and stored in the dark at room temperature. Tube A contained 2,2,6,6-tetramethyl piperidine-1-oxyl at a concentration of 0.01% by weight on monomer. Tube B contained no additive and was a blank.

After 115 hours it was observed that the popcorn seed in Tube B had grown to ten times its initial size, while the liquid at the bottom of the tube had become viscous. No change in the size of the popcorn seed in Tube A was apparent; the monomer at the bottom of the tube was colourless and mobile.

This test demonstrates the efficacy of the nitroxide of the invention in preventing both polymerization in the liquid phase and the growth of popcorn polymer from monomer in the vapour phase and furthermore shows that no coloured adducts were formed from the nitroxide and chloroprene.

Example 7

5 ml. of freshly distilled chloroprene was pipetted into each of two tubes A and B. The tubes were of 10 ml. volume so that when they were stoppered 5 ml. of air at atmospheric pressure was confined above the monomer. Tube A contained di-tert.butyl nitroxide at a concentration of 0.02% by weight on monomer. Tube B contained no additive and was a blank. After 160 hours only a very small quantity of liquid residue which was viscous as a result of polymerization remained in the bottom of Tube B. The remainder of the original liquid charge had formed pop-corn polymer in the vapour space at the top of the tube. The liquid in Tube A, however, was still mobile and no growth of popcorn polymer had taken place in the vapour space in the upper part of the tube.

The nitroxide is clearly able to stabilize the chloroprene against polymerization even in the presence of some oxygen.

I claim:

1. The composition comprising chloroprene monomer and a polymerization-inhibiting amount of the nitroxide having the formula:

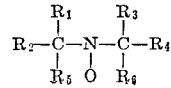

wherein $R_1$, $R_2$, $R_3$ and $R_4$ are alkyl of 1 to 15 carbon atoms and $R_5$ and $R_6$ are alkyl of 1 to 15 carbon atoms or $R_5$ and $R_6$ together form a ring containing 4 or 5 carbon atoms.

2. The composition according to claim 1 wherein $R_1$ to $R_4$ are alkyl of 1 to 3 carbon atoms.

3. The composition according to claim 1 wherein $R_5$ and $R_6$ are alkyl of 1 to 3 carbon atoms.

4. The composition according to claim 1 wherein the total number of carbon atoms in the molecule of the nitroxide having the essential skeletal structure is 8 or 9.

5. A composition comprising chloroprene monomer and as a stabilizer a nitroxide having the essential skeletal structure

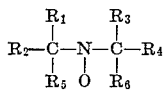

wherein $R_1$, $R_2$, $R_3$ and $R_4$ are alkyl of 1 to 15 carbon atoms and $R_5$ and $R_6$ are alkyl of 1 to 15 carbon atoms or $R_5$ and $R_6$ together form a ring in amount between 10 and 1000 parts per million of chloroprene.

6. A composition according to claim 5 wherein said stabilizer is di-tertiary butylnitroxide 2,2,6,6-tetramethyl-4-hydroxy-piperidine-1-oxyl or 2,2,6,6-tetramethyl piperidine-1-oxyl.

7. A composition according to claim 5 wherein said stabilizer is a nitroxide in which $R_5$ and $R_6$ together form part of a ring containing a total of 4 or 5 carbon atoms.

8. The composition according to claim 16 wherein the nitroxide having the essential skeletal structure is di-tert. butyl nitroxide.

9. The composition according to claim 16 wherein the nitroxide having the essential skeletal structure is a pyrrolidone-1-oxyl or a piperidine-1-oxyl.

10. The composition according to claim 9 wherein the nitroxide is 2,2,6,6-tetramethyl piperidine-1-oxyl.

11. The composition which comprises chloroprene monomer and a polymerization inhibiting amount of 2,2,6,6-tetramethyl-4-hydroxy-piperidine-1-oxyl.

References Cited

UNITED STATES PATENTS

| | | | |
|---|---|---|---|
| 2,302,362 | 11/1942 | Nelles | 260—652.5 |
| 2,874,162 | 2/1959 | Blumenthal | 260—652.5 |
| 3,048,639 | 8/1962 | Vogt | 260—652.5 |

LEON ZITVER, Primary Examiner

HOWARD J. MAR, Assistant Examiner